United States Patent
Nishio

(10) Patent No.: US 10,857,602 B2
(45) Date of Patent: Dec. 8, 2020

(54) DIMPLES PROCESSING METHOD BY MEANS OF END MILLING AND END MILL

(71) Applicant: KANEFUSA KABUSHIKI KAISHA, Niwa-gun (JP)

(72) Inventor: Satoru Nishio, Niwa-gun (JP)

(73) Assignee: KANEFUSA KABUSHIKI KAISHA, Niwa-gun (JP)

( * ) Notice: Subject to any disclaimer, the term of this patent is extended or adjusted under 35 U.S.C. 154(b) by 0 days.

(21) Appl. No.: 15/580,023

(22) PCT Filed: Jun. 21, 2016

(86) PCT No.: PCT/JP2016/002982
§ 371 (c)(1),
(2) Date: Dec. 6, 2017

(87) PCT Pub. No.: WO2017/002326
PCT Pub. Date: Jan. 5, 2017

(65) Prior Publication Data
US 2018/0154461 A1    Jun. 7, 2018

(30) Foreign Application Priority Data

Jun. 29, 2015    (JP) ................... 2015-129871
Feb. 26, 2016    (JP) ................... 2016-035790

(51) Int. Cl.
*B23C 5/10* (2006.01)
*B23C 3/00* (2006.01)
*B23C 3/28* (2006.01)

(52) U.S. Cl.
CPC ................. *B23C 5/10* (2013.01); *B23C 3/00* (2013.01); *B23C 3/28* (2013.01);
(Continued)

(58) Field of Classification Search
CPC .... B44B 3/02; B23C 5/12; B23C 5/14; B23C 2220/48; B23C 2210/242
(Continued)

(56) References Cited

U.S. PATENT DOCUMENTS 3,841,199 A * 10/1974 Jepson .................. B23C 3/16
                                                                               408/3
4,028,992 A * 6/1977 Kuehnle ................ B23C 3/32
                                                                               409/132
(Continued)

FOREIGN PATENT DOCUMENTS

CN        203 109 327 U     8/2013
CN        203 304 662 U    11/2013
(Continued)

OTHER PUBLICATIONS

Combined Office Action and Search Report dated Sep. 14, 2018 in Chinese Patent Application No. 201680030429.2, 13 pages (with English translation of the Office Action and English translation of categories of cited documents).
(Continued)

*Primary Examiner* — Nicole N Ramos
(74) *Attorney, Agent, or Firm* — Oblon, McClelland, Maier & Neustadt, L.L.P.

(57) ABSTRACT

An end mill includes a major-diameter shank, a cone-shaped connector portion disposed at the end of the shank, a minor-diameter body disposed by way of the connector portion coaxially therewith, a toothed element disposed at the leading end of the body, an installation recess dented slightly in the toothed element, and a cutting edge held in the installation recess so as to swell in the shape of an arc to protrude from an outer peripheral face of the body.

5 Claims, 17 Drawing Sheets

(52) U.S. Cl.
  CPC .. *B23C 2210/084* (2013.01); *B23C 2210/201* (2013.01); *B23C 2210/242* (2013.01); *B23C 2220/48* (2013.01); *B23C 2265/08* (2013.01)

(58) Field of Classification Search
  USPC .................................................. 409/131, 132
  See application file for complete search history.

(56) References Cited

U.S. PATENT DOCUMENTS

| | | | | |
|---|---|---|---|---|
| 4,132,493 A * | 1/1979 | Hosoi | ................... | B23C 5/1018 |
| | | | | 407/42 |
| 4,252,480 A * | 2/1981 | Mizuno | ................. | B23B 51/048 |
| | | | | 407/113 |
| 4,411,564 A * | 10/1983 | Johnson | ................. | B23C 5/109 |
| | | | | 407/113 |
| 4,781,049 A * | 11/1988 | Farrar | ................... | B24B 19/028 |
| | | | | 29/896.41 |
| 4,868,961 A * | 9/1989 | Coleman | ................ | B44B 3/006 |
| | | | | 29/33 Q |
| 4,954,022 A * | 9/1990 | Underwood | ............ | B23B 35/00 |
| | | | | 408/1 R |
| 4,963,059 A * | 10/1990 | Hiyama | ................. | B23C 5/003 |
| | | | | 407/11 |
| 5,005,838 A * | 4/1991 | Oka | ................... | A63B 37/0004 |
| | | | | 40/327 |
| 5,094,573 A * | 3/1992 | Hougen | ............. | B23B 51/0406 |
| | | | | 407/53 |
| 5,197,361 A * | 3/1993 | Carrier | ................... | B23B 29/02 |
| | | | | 408/181 |
| 5,213,456 A * | 5/1993 | Lee | .................. | B23B 51/0406 |
| | | | | 408/203.5 |
| 5,387,061 A | 2/1995 | Barkman et al. | | |
| 5,406,043 A * | 4/1995 | Banji | ...................... | B23H 9/06 |
| | | | | 219/69.17 |
| 5,622,460 A * | 4/1997 | Satran | ................... | B23C 5/1045 |
| | | | | 407/42 |
| 5,681,134 A * | 10/1997 | Ebert | .................. | B23B 51/0406 |
| | | | | 144/218 |
| 5,788,435 A * | 8/1998 | McCarthy | ............ | G05B 19/402 |
| | | | | 318/572 |
| 5,938,381 A * | 8/1999 | Diehl | ..................... | B24B 11/00 |
| | | | | 409/131 |
| 5,980,232 A * | 11/1999 | Shimosaka | ........ | A63B 37/0004 |
| | | | | 264/219 |
| 6,012,882 A * | 1/2000 | Turchan | ................ | B23G 5/188 |
| | | | | 408/222 |
| 6,196,769 B1 * | 3/2001 | Satran | ................... | B23B 51/00 |
| | | | | 407/40 |
| 6,224,299 B1 * | 5/2001 | Frecska | ................. | B23G 5/182 |
| | | | | 407/41 |
| 6,390,740 B1 * | 5/2002 | Nesbitt | ............. | A63B 37/0004 |
| | | | | 29/899 |
| 6,476,971 B1 | 11/2002 | Border et al. | | |
| 6,499,917 B1 * | 12/2002 | Parker | ................... | B23C 5/109 |
| | | | | 407/25 |
| 6,726,413 B1 * | 4/2004 | Stelson | ................... | B23C 3/00 |
| | | | | 409/132 |
| 7,402,004 B2 * | 7/2008 | Tanaka | ................... | B23C 5/10 |
| | | | | 407/53 |
| 8,573,909 B2 * | 11/2013 | Hecht | .................... | B23B 31/11 |
| | | | | 409/234 |
| 8,991,287 B2 * | 3/2015 | Bhapkar | .................. | B23B 1/00 |
| | | | | 82/1.11 |
| 9,573,202 B2 | 2/2017 | Yasukochi et al. | | |
| 9,925,603 B2 * | 3/2018 | Yajima | ...................... | B23C 5/10 |
| 2001/0020406 A1 * | 9/2001 | Schmitt | .................. | B23G 5/182 |
| | | | | 82/1.11 |
| 2001/0024327 A1 | 9/2001 | Fujimoto et al. | | |
| 2006/0056927 A1 * | 3/2006 | Rieke | ........................ | B23C 5/10 |
| | | | | 407/54 |
| 2006/0063021 A1 * | 3/2006 | Sekikawa | ................ | B23P 9/02 |
| | | | | 428/577 |
| 2008/0193232 A1 | 8/2008 | Van Iperen | | |
| 2008/0244891 A1 * | 10/2008 | Iizumi | .................. | B23B 27/007 |
| | | | | 29/527.4 |
| 2010/0172703 A1 | 7/2010 | Neubold | | |
| 2010/0326270 A1 * | 12/2010 | Doerfler | .................... | B23P 9/00 |
| | | | | 92/169.1 |
| 2012/0096999 A1 * | 4/2012 | Hyatt | ............... | G05B 19/40938 |
| | | | | 82/1.11 |
| 2012/0137770 A1 * | 6/2012 | Fitchett | ............. | A63B 37/0004 |
| | | | | 73/32 R |
| 2012/0207869 A1 * | 8/2012 | Imai | ......................... | B23C 3/20 |
| | | | | 425/175 |
| 2014/0007748 A1 | 1/2014 | Bhapkar et al. | | |
| 2015/0056036 A1 | 2/2015 | Yasukochi et al. | | |

FOREIGN PATENT DOCUMENTS

| | | | | |
|---|---|---|---|---|
| CN | 104220214 A | 12/2014 | | |
| DE | 20 2007 010 616 U1 | 10/2007 | | |
| DE | 10 2007 010163 A1 | 9/2008 | | |
| DE | 102009052642 A1 * | 5/2011 | ............ | B27M 1/003 |
| DE | 20 2013 105 739 U1 | 3/2014 | | |
| EP | 1927444 A2 * | 6/2008 | ................ | B23C 5/04 |
| EP | 2 213 399 A1 | 8/2010 | | |
| JP | 8-11223 A | 1/1996 | | |
| JP | 10-52998 A | 2/1998 | | |
| JP | 2002-205310 A | 7/2002 | | |
| JP | 2002-361510 A | 12/2002 | | |
| JP | 2003084370 A * | 3/2003 | ............ | G03B 21/60 |
| JP | 2003236809 A * | 8/2003 | | |
| JP | 2004-9158 A | 1/2004 | | |
| JP | 2005-212015 A | 8/2005 | | |
| JP | 2008-246587 A | 10/2008 | | |
| JP | 2010-36277 A | 2/2010 | | |
| WO | WO 2008/097170 A1 | 8/2008 | | |
| WO | WO-2015064114 A1 * | 5/2015 | ............. | B23C 5/10 |
| WO | WO-2017119298 A1 * | 7/2017 | ............. | B23C 3/00 |
| WO | WO-2017199911 A1 * | 11/2017 | ............. | B23C 3/00 |

OTHER PUBLICATIONS

International Search Report dated Aug. 9, 2016, in PCT/JP2016/002982, filed Jun. 21, 2016.
Extended European Search Report dated Apr. 2, 2019 in the corresponding European Application No. 16817438.1 17 pages.
Notice of Reasons for Refusal dated Sep. 3, 2019 in Japanese Application No. 2017-526166 (14 pages).
Indian Office Action dated Feb. 12, 2020 in Indian Patent Application No. 201747046224 (with English translation), 7 pages.

* cited by examiner

DIMPLES PROCESSING METHOD BY MEANS OF END MILLING AND END MILL

TECHNICAL FIELD

The present invention relates to a dimples processing method, which forms dimples on the surface of a workpiece, such as aluminum, copper alloys, cast products of those, cast iron and resins, by means of end milling, and to an end mill.

BACKGROUND ART

Forming a large number of dimples on the surface of a workpiece, such as aluminum, results in turning the surface into a matted or satin pattern. Thus, it has been known that the following advantageous effects are obtained: the superficial area decreases to lead to reducing the contact resistance, so that the sliding frictional resistance decreases to result in improving the wear resistance; in the case of fluid lubrication, the fluid resistance decreases; and so forth. Taking notice of such characteristics of the surface with dimples processed, attempts have been done so as to form dimples on the following: the inner wall face of engine cylinders or turbochargers, and the like; or on the joining faces between artificial joints, and so forth. As for methods of processing dimples, the following have been known: methods by means of laser irradiation; methods by means of overall cutting work by tools; methods by means of shot peening in which minute balls are collided with workpieces at high speeds; and so on. However, the laser irradiation is associated with such a problem that large thermal stresses arise in a workpiece because the workpiece is heated at a high temperature. It is difficult for the overall cutting work to cut or machine out a uniform or even face. Moreover, in the shot peening, since it is difficult to form dimples onto deep holes and concaved or dented faces, such a problem arises that it is not possible to arrange the resultant dimples in a desired state.

Moreover, as disclosed in Patent Literature No. 1, a decorative method for forming polka-dot patterned dimples on the surface of a workpiece has been known. In the decorative method, although cutting-edge or blade marks, namely, so-called knife marks, occur on the cut face in a workpiece because of differences in height, and the like, at the boundary between the cutting edges during the surface cutting work by means of a rotary cutting tool, like an end mill or milling cutter, such knife marks are utilized to form the polka-dot patterned dimples. According to this decorative method, it is said possible to form polka-dot patterns, in which small and large circles line up in series on the resulting surface, by means cutting the minimum cutting-edge tip of the rotary cutting tool into the surface of a workpiece to such an extent that it slightly hits the surface. However, it is difficult for this decorative method to form dimples highly densely. Moreover, it is difficult for it to form dimples onto bores deep inside cylinders, and the like, and onto not-smooth or uneven curved faces. In addition, it is also difficult for it to arrange dimples as arbitrary configurations, such as helices. Because of the above, this decorative method is associated with such a problem that it is limited to extremely simple applications, like for mere or uncomplicated decorations, and so on.

RELATED TECHNICAL LITERATURE

Patent Literature

Patent Literature No. 1: Japanese Unexamined Patent Publication (KOKAI) Gazette No. 10-052998

SUMMARY OF THE INVENTION

Assignment to be Solved by the Invention

The present invention is intended so as to solve such problems as described above. It is aimed at providing: a dimples processing method by means of end milling, the dimples processing method being capable of forming desirably-arranged dimples highly densely onto an arbitrary surface, like an irregular curved face, or onto the inner wall face of a deep hole or bore, and so forth; and an end mill used for the same.

Means for Solving the Assignment

In order to achieve the aforementioned objects, constructional features according to the present lie in that they make a dimples processing method by means of end milling, the dimples processing method being adapted for processing dimples, which are separated away from each other, by rotary cutting a surface of a workpiece using an end mill provided with one toothed element which comprises one or two cutting edges disposed on an outer peripheral face of a rod-shaped body; and the dimples processing method forming the dimples in a quantity of one or two by turning the body once. Note herein that "dimples" are minor-diameter concaves or dents formed to separate away from each other, and are formed in a quantity of one or two for every turn or rotation of the body. The "toothed element" signifies a collection of cutting edges in a place at an axial location on a periphery going around the body once, and will denote the same hereinafter. Although the body, on which the toothed element is disposed, usually has a diameter of 10 mm or less approximately, the diameter can especially preferably be 4 mm or less. It becomes feasible to arrange the dimples more finely and with higher density by making the diameter smaller. Moreover, as for a material quality of the workpiece on which the dimples are formed, the following are available: aluminum, copper alloys, cast products of aluminum or copper alloys, cast iron, resins, and the like.

In the present invention constructed as mentioned above, it is possible to form one dimple, or two dimples at positions away from one another, by turning or rotating the body once. Consequently, it becomes feasible to form a large number of the dimples not limited on a plain face of the workpiece, but on arbitrarily-configured irregular curved faces, with high density and in desired arrangement by turning the body at a high rate while controlling it. As a result, in the present invention, the following advantageous effects are available: regarding faces on which the dimples are formed, it is possible to reduce the sliding frictional resistance or fluid resistance; it is possible to improve the wear resistance or heat-radiating property; and so forth.

Moreover, in the present invention, it is possible that the body can include a conical portion reducing diametrically as heading toward a leading end thereof; and that the one toothed element can be disposed on an outer peripheral face of the conical portion. Thus, it is possible to dispose the toothed element at a minor-diameter part on the leading-end side of the conical portion. Consequently, it is possible to make a diameter of the toothed element smaller while securing strength for the body on the root side where it has a large diameter. As a result, in accordance with the present invention, it becomes feasible to form the dimples more finely and with higher density, and it moreover becomes feasible to form the dimples in desired arrangements especially even onto concaved or dented curved faces, and the like, regardless of superficial configurations of the workpiece.

In addition, in the present invention, it is possible to set an inclination angle to fall in a range of from −20 deg. to +75 deg. at a contact position between the body and the workpiece. Note herein that the "tangential face in the workpiece" is a tangential plane itself at the contact position when the workpiece has a plain face, whereas the term signifies an imaginary tangential plane at the contact position when the workpiece has a curved face. Although it is thus allowed that the inclination angle can fall in a range of from −20 deg. to +75 deg., it is more preferable that it can fall in a range of from 0 deg. to +60 deg. It is possible to adjust the dimples in the diameter and depth, and to adjust intervals between the dimples, by setting the inclination angle to fall in the ranges. Although it becomes feasible to form the dimples in cutting an end face of the workpiece when the inclination angle is negative, it becomes impossible to form the dimples when the inclination is smaller than −20 deg. Moreover, when the inclination angle is larger than +75 deg., it becomes impossible to form the dimples because the intervals between the neighboring dimples become zero so that the dimples have been further connected or linked to each other between the concaves or dents.

Moreover, in the present invention, the end mill can turn around an axial center, and the axial line can also move in compliance with a superficial configuration of the workpiece. Attaching the end mill to a driving control apparatus, such as a multi-jointed robot, leads to making it feasible to move the axial center in the body in compliance with a superficial configuration of the workpiece while turning or rotating the end mill about the axial center serving as the center; and the thus moved end mill results in making it feasible to process the dimples onto the workpiece, which have various irregular curved faces, by driving the body alone. Consequently, it is possible to process the dimples more easily or readily and highly accurately.

In addition, second features according to the present invention lie in that they make a dimples processing method by means of end milling, the dimples processing method being adapted for processing dimples, which are separated away from each other, by rotary cutting a workpiece on a surface thereof using an end mill provided with two toothed elements, which comprise a rod-shaped body, and one or two cutting edges disposed respectively on an outer peripheral face of the rod-shaped body; and the dimples processing method forming the dimples in a quantity of from two or more to four or less by turning the body once. In the second features, it is possible to combinedly form the dimples in a quantity of from two or more to four or less at a circumferentially identical position, or at circumferentially distinct positions, in two locations apart from one another in the axial direction. Consequently, it is possible to form the dimples more variously. Even in the second features, it is possible that the body can include a conical portion reducing diametrically as heading toward a leading end thereof; and that the two toothed elements can be disposed on an outer peripheral face of the conical portion. Moreover, it is possible that an inclination angle can be set to fall in a range of from −20 deg. to +75 deg. at a contact position between the body and the workpiece. In addition, it is possible that the end mill can turn around an axial center, and the axial center can also move in compliance with a superficial configuration of the workpiece.

Moreover, third features according to the present invention lie in that they make a dimples processing method by means of end milling, the dimples processing method being adapted for processing dimples, which are separated away from each other, by rotary cutting a workpiece on a surface thereof using an end mill; and the dimples processing method using a ball-end mill, which comprises a body and a spherical cutting edge disposed on an end face of the body, as the end mill. Thus, it is possible to form the dimples, which are separated away from each other, on a surface of the workpiece even by means of using the ball-end mill as well.

In addition, fourth features according to the present invention are as follows: an end mill comprising: a rod-shaped body; and one toothed element including one or two cutting edges, and disposed on an outer peripheral face of the body; and the end mill enabling dimples to be formed in a quantity of one or two on a surface of a workpiece by turning once. Moreover, in the fourth features, it is possible that the body can include a conical portion reducing diametrically as heading toward a leading end thereof; and that the one toothed element is disposed on an outer peripheral face of the conical portion.

Moreover, fifth features according to the present invention lie in that they make an end mill comprising: a rod-shaped body; and two toothed elements including one or two cutting edges, and disposed respectively on an outer peripheral face of the body; and the end mill enabling dimples to be formed in a quantity of from two or more to four or less on a surface of a workpiece by turning once. In addition, in the fifth features, it is possible that the body can include a conical portion reducing diametrically as heading toward a leading end thereof; and that the toothed elements can be disposed on an outer peripheral face of the conical portion.

In the present invention, it becomes feasible to form a large number of dimples on a surface of a workpiece, which has an arbitrary configuration, such as a plain face or irregular face, with high density and in a desired arrangement by providing an end mill's rod-shaped body with one or two toothed elements having one or two cutting edges. As a result, in the present invention, the following advantageous effects are obtainable: regarding the resulting faces on which the dimples are formed, it is possible to reduce the sliding frictional resistance or fluid resistance; it is possible to improve the wear resistance or heat-radiating property; and so forth. Accordingly, it is possible to employ the dimples-formed faces suitably for the inner and outer wall faces of engine cylinders or turbochargers, and the like, and the joining faces between artificial joints, or the like. Moreover, in the present invention, disposing the one or two toothed elements on the leading-end side of a body, which comprises a conical portion, leads to enabling a diameter to be made smaller on the body's leading-end side, on which the toothed elements are disposed, while securing strength for the body on the major-diameter root side. Consequently, it is possible to form the dimples more finely and with higher density, and moreover to form the dimples on wall faces, which have irregularly-faced configurations, in desired arrangements. In addition, in the present invention, it is possible to adjust diameters and depths of the resultant dimples, and intervals between the dimples by setting an inclination angle of the axial center line in the body with respect to a tangential face in the workpiece to fall in a range of from −20 deg. to +75 deg. at a contact position between the body and the workpiece. Moreover, in the present invention, even using a ball-end mill as the end mill also results in enabling the dimples, which are separated away from each other, to be formed on a surface of the workpiece.

MODE FOR CARRYING OUT THE INVENTION

Figure 1:
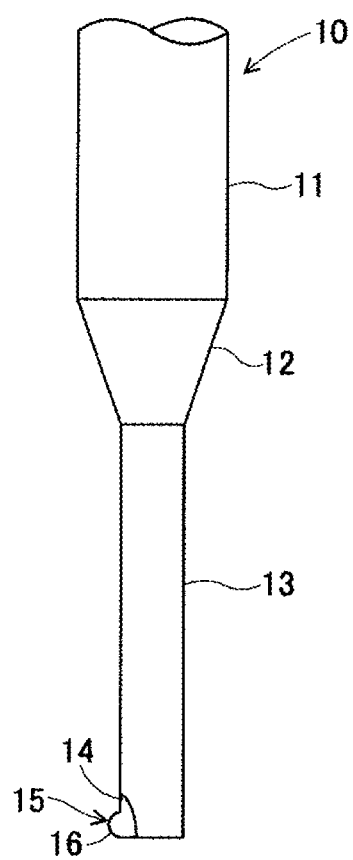
FIG. 1 is a front view schematically showing an end mill directed to First Embodiment according to the present invention.

Hereinafter, embodiments according to the present invention will be described using the drawings. FIG. 1 is a drawing in which an end mill for rotary cutting directed to First Embodiment is shown by the front view. The end mill 10 is made of iron; has a round rod or bar shape; and is provided with a major-diameter shank 11, a conical connector portion 12 disposed at an end of the shank 11, and a minor-diameter body 13 disposed by way of the connector portion 12 coaxially with it; and is further provided with an installation recess 14 concaved or dented slightly at the leading end of the body 13. The body 13 is a minor-diameter round rod whose size is 10-mm length×φ1.5-mm diameter, for instance; and is provided with a toothed element 15 at the leading end. To the installation recess 14, a semispherical tip, which makes the toothed element 15 and is made of cemented carbide, is installed; and is put in place so that a cutting edge 16, which is disposed at the leading end of the tip, swells in the shape of a semicircle to protrude from an outer peripheral face of the body 13. Thus, in First Embodiment, the toothed element 15 is disposed in a quantity of one at the leading end of the body 13, and comprises the one cutting edge 16 at a location in the circumferential direction. One dimple is formed by turning or rotating the body 13 once. Note that, as to a configuration of the cutting edge 16, the following are available: a semicircled configuration 16a whose height is low; a semicircled configuration 16b whose height is high; a triangled configuration 16c whose height is low; a triangled configuration 16d whose height is high; a trapezoided configuration 16e; an angled configuration 16d swollen in the shape of a curved face; an angled configuration 16e concaved or dented in the shape of a curved face; or a quadrangled configuration 16h; and the like, as shown in FIG. 3A through FIG. 3H.

Figure 2:
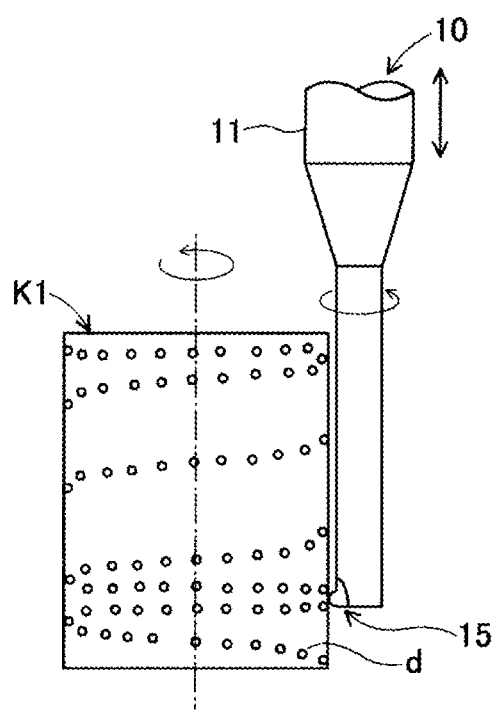
FIG. 2 is an explanatory diagram illustrating First Processed Example made by the same end mill.
Figure 3A:
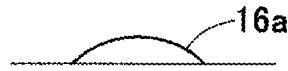
FIG. 3A is a front view showing First Example of a cutting edge to be disposed on the same end mill.
Figure 3B:
FIG. 3B is a front view showing Second Example of a cutting edge to be disposed on the same end mill.
Figure 3C:
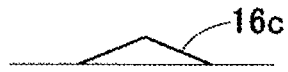
FIG. 3C is a front view showing Third Example of a cutting edge to be disposed on the same end mill.
Figure 3D:
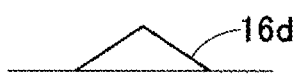
FIG. 3D is a front view showing Fourth Example of a cutting edge to be disposed on the same end mill.
Figure 3E:
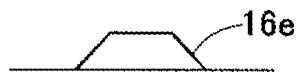
FIG. 3E is a front view showing Fifth Example of a cutting edge to be disposed on the same end mill.
Figure 3F:
FIG. 3F is a front view showing Sixth Example of a cutting edge to be disposed on the same end mill.
Figure 3G:
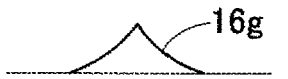
FIG. 3G is a front view showing Seventh Example of a cutting edge to be disposed on the same end mill.
Figure 3H:
FIG. 3H is a front view showing Eighth Example of a cutting edge to be disposed on the same end mill.
Figure 4A:
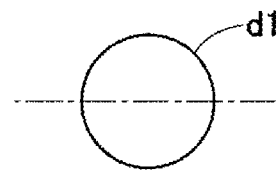
FIG. 4A is a plan view showing First Example of a dimple that is formed by the cutting edge.
Figure 4B:
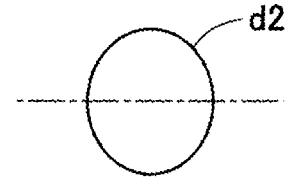
FIG. 4B is a plan view showing Second Example of a dimple that is formed by the cutting edge.
Figure 4C:
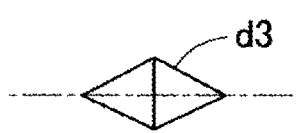
FIG. 4C is a plan view showing Third Example of a dimple that is formed by the cutting edge.
Figure 4D:
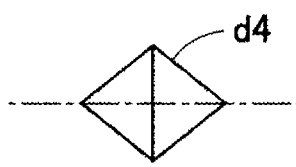
FIG. 4D is a plan view showing Fourth Example of a dimple that is formed by the cutting edge.
Figure 4E:
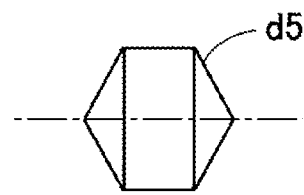
FIG. 4E is a plan view showing Fifth Example of a dimple that is processed by the cutting edge.
Figure 4F:
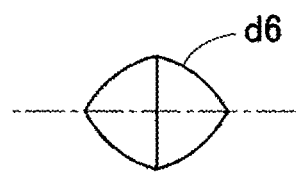
FIG. 4F is a plan view showing Sixth Example of a dimple that is formed by the cutting edge.
Figure 4G:
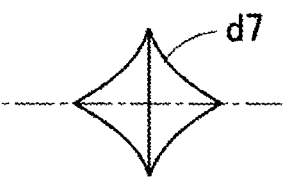
FIG. 4G is a plan view showing Seventh Example of a dimple that is formed by the cutting edge.
Figure 4H:
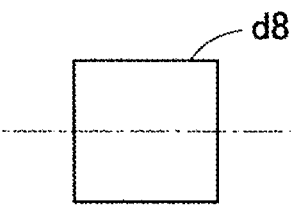
FIG. 4H is a plan view showing Eight Example of a dimple that is formed by the cutting edge.

First Processed Example of dimples by the end mill 10 will be illustrated by FIG. 2. First Process Example is a process in which a dimples processing operation is performed onto a cylinder-shaped workpiece "K1" on the outer peripheral face. The end mill 10 is fixed on the side of the shank 11 to a not-shown rotary driving apparatus, so that it is made not only turnable or rotatable at a predetermined revolving speed but also movable at a predetermined rate in the axial direction. The workpiece "K1" is made of aluminum; has a cylindrical configuration; and is made rotatable at a predetermined revolving speed by another not-shown rotary driving apparatus. The dimples processing operation is performed by moving the end mill 10 in the axial direction as being turned, or vice versa, while rotating the workpiece "K1," so that dimples "d," which are separated away from each other, are laid out in the shape of a helix on the outer peripheral face of the workpiece "K1." Note that, as to a configuration of the dimples "d," the configuration turns into being like "d1" through "d8," as shown in FIG. 4A through FIG. 4H, in compliance with the configurations of the cutting edges 16a through 16h shown in FIG. 3A though FIG. 3H. Alternatively, the dimples "d" are processible even when the workpiece "K1" is fixated, and the end mill 10 is moved.

Figure 5:
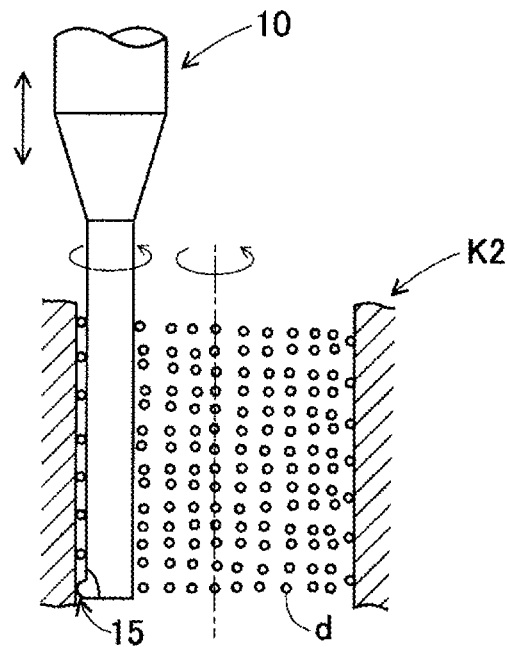
FIG. 5 is an explanatory diagram illustrating Second Processed Example made by the same end mill.

Next, Second Processed Example will be illustrated by FIG. 5. Second Processed Example is a process in which a dimples processing operation is performed onto a workpiece "K2," which has a cylinder-shaped axial bore or hole, on the axial-bore inner peripheral face. The end mill 10, which has been set in the same manner as First Processed Example, is put in place snugly against the inner peripheral face of the workpiece "K2," and then the end mill 10 is moved at a predetermined rate in the axial direction as being turned, or vice versa, while rotating the workpiece "K2." Thus, the dimples processing operation is performed helically and with high density onto the workpiece "K2" on the inner peripheral face.

Figure 6:
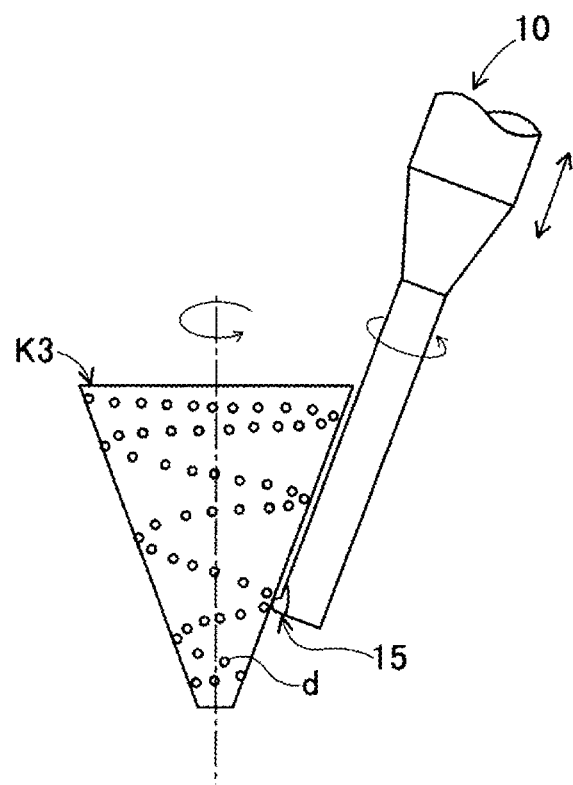
FIG. 6 is an explanatory diagram illustrating Third Processed Example made by the same end mill.

Subsequently to the above, Third Processed Example will be illustrated by FIG. 6. Third Processed Example is a process in which a dimples processing operation is performed onto a workpiece "K3," which has the shape of a circular truncated cone, on the outer peripheral face. The end mill 10, which has been set in the same manner as First Processed Example, is put in place snugly against the outer peripheral face of the workpiece "K3," and then the end mill 10 is moved at a predetermined rate in the axial direction as being turned, or vice versa, while rotating the workpiece "K3." Thus, the dimples processing operation is performed helically onto the workpiece "K3" on the outer peripheral face.

As described above, in First Embodiment, since it is possible to form the dimples in a quantity of one by turning or rotating the end mill 10 once, it becomes feasible to form the dimples in desired arrangements with high density on the irregular curved faces in the workpieces ("K1," "K2," "K3"), and the like, by turning the body 13 at high rates while controlling it. As a result, in First Embodiment, the following advantageous effects are obtainable: regarding the faces with the dimples formed, the sliding friction resistance or fluid resistance can be reduced; the wear resistance or heat radiating property can be improved; and so on. Consequently, the faces with the dimples formed can be employed suitably for many applications, such as the cylinders of an engine, the inner and outer wall faces of a piston or turbocharger and the joining faces between artificial joints, in compliance with their characteristics.

Note that, in First Embodiment, it is desirable to perform a surface treatment onto the processed faces of the workpieces on which the dimples are formed. For example, the following are available: chromium-, nickel- or titanium-based plating; coating by PVD or CVD, and the like; CVD with diamond or DLC; or applying carbon, graphite, resin or molybdenum disulfide; and so forth. Moreover, in First Processed Example, although the dimples are arranged helically, the other arrangements, such as circular shapes, straight-line shapes and curved-line shapes, are also feasible.

Figure 7A:
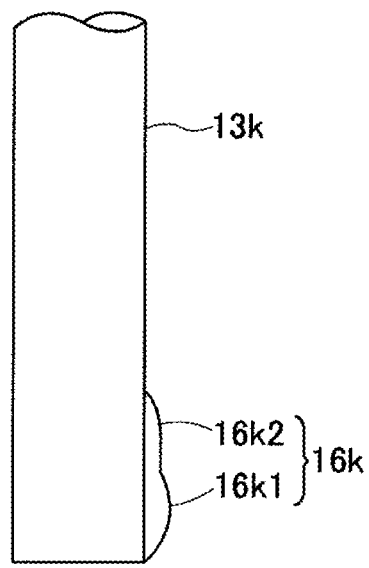
FIG. 7A is a front view showing First Modified Embodiment of the cutting edge.
Figure 7B:
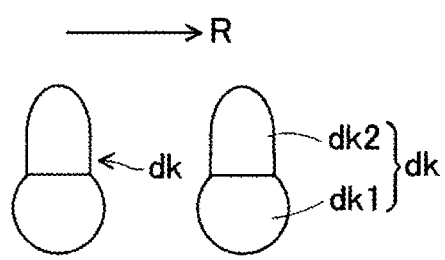
FIG. 7B is a plan view showing dimples according to First Modified Embodiment.

Next, First Modified Embodiment of the cutting edge will be illustrated by FIG. 7A and FIG. 7B. As illustrated in FIG. 7A, the cutting edge 16k according to First Modified Embodiment is a cutting edge comprising two parts, namely, a leading-end-side high crested part 16k1 having a circular shape; and a low crested part 16k2 following the crested part 16k1 to extend in the axial direction, and having a semicircular shape. Thus, since the cutting edge 16k comprises the high crested part 16k1 and low crested part 16k2 that are continuous with one another, the configuration of dimples to be formed turns into such a configuration as including a circular deep part "dk1," which is arranged perpendicularly to the rotary direction "R"; and a semicircular shallow part "dk2," which follows the circular deep part "dk1," as shown in FIG. 7B. An advantageous effect of the dimples "dk," retaining a lubricant or the like therein, is enhanced by thus making the dimples "dk" into the deep/shallow dual-consecutive structure. As a result, the advantageous effect of lowering the processed faces in the friction is further enhanced.

Figure 8A:
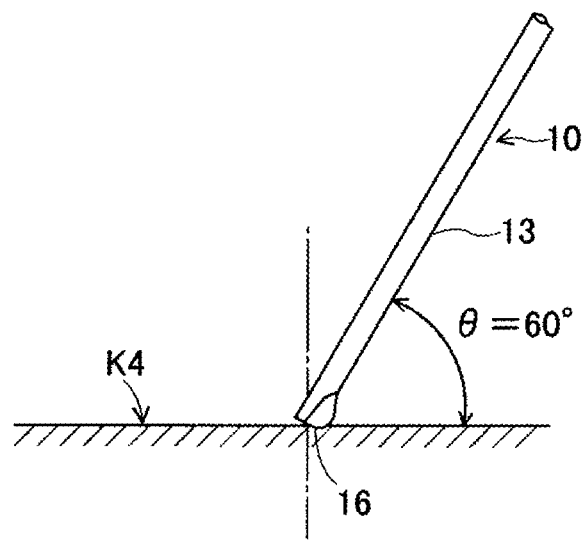
FIG. 8A is an explanatory diagram showing a case where the end mill is inclined at an inclination angle of 60 deg. with respect to a workpiece's surface.
Figure 8B:
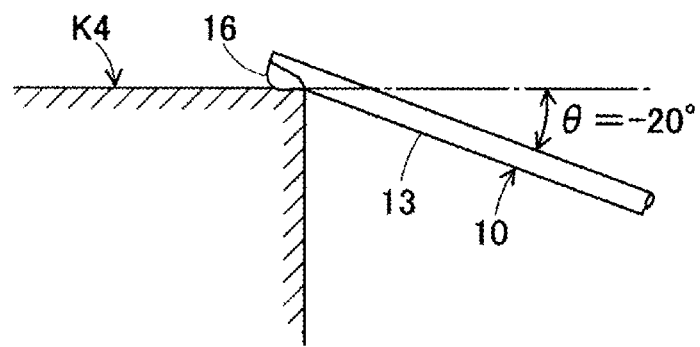
FIG. 8B is an explanatory diagram showing another case where the end mill is inclined at an inclination angle of −20 deg. with respect to a workpiece's surface.

In aforementioned First Embodiment, the body 13 comprises the round rod-shaped end mill 10 whose axial center is arranged parallel to a surface (or tangential face) in the workpieces. However, as illustrated in FIG. 8A, it is possible to do cutting operations under such a condition that the axial center of the body 13 is inclined with respect to the surface (or tangential face) in a workpiece "K4." The axial center of the body 13 herein exhibits an inclination angle θ of 60 deg. with respect the surface of the workpiece "K4." The inclination angle θ can preferably fall in a range of from −20 deg. to +75 deg. The inclination angle falling in the range makes it possible to adjust the diameter and depth of the dimples, and the intervals between the dimples. When the inclination angle θ is larger than +75 deg., the dimples have been connected or linked to each other between the concaves or depressions so that it becomes impossible to form the dimples which are separated away from each other. Moreover, when the inclination angle θ is negative, such as the axial center of the body 13 exhibits an inclination angle θ=−20 deg., as shown in FIG. 8B, it is applied in cutting the workpiece "K4" on the end face. However, when the inclination angle θ is smaller than −20 deg., it becomes impossible to form the dimples because the body 13 of the end mill 10 becomes likely to come in contact with the workpiece "K4."

Next, Second through Fifth Embodiments of the end mill 10 will be illustrated by FIG. 9A through FIG. 9D.

Figure 9A:
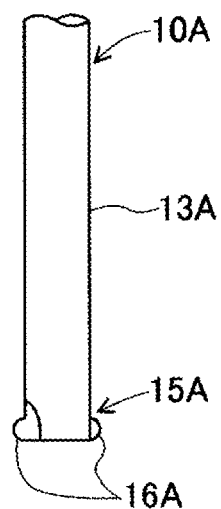
FIG. 9A is a front view showing an end mill directed to Second Embodiment.

As illustrated in FIG. 9A, an end mill 10A according to Second Embodiment is an end mill comprising, serving as one toothed element 15A which is disposed at the leading end of a body 13A, cutting edges 16A, each one of which is respectively disposed at two locations opposing to one another with the axial center of the body 13A interposed between them. In accordance with the end mill 10A, since the dimples are formed in a quantity of two in the rotary direction by turning the body 13A once, it becomes feasible to form the dimples with much higher density.

Figure 9B:
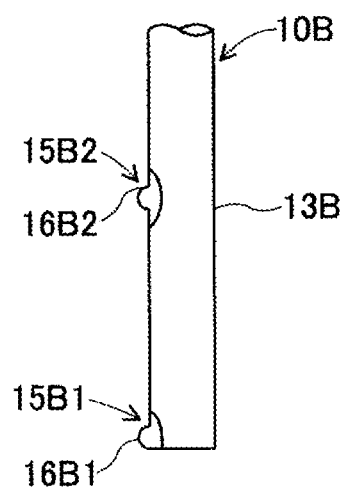
FIG. 9B is a front view showing an end mill directed to Third Embodiment.

As illustrated in FIG. 9B, an end mill 10B according to Third Embodiment comprises two toothed elements (15B1, 15B2) disposed at two locations which are separated away from one another axially in a body 10B. The respective toothed elements (15B1, 15B2) are toothed elements each including one of cutting edges (16B1, 16B2) which are disposed respectively at one location in the circumferential direction but at an identical position in the axial direction. In accordance with the end mill 10B, turning the body 13B once makes it feasible to form the dimples in a quantity of one, respectively, at two locations which are separated away from one another in the axial direction.

Figure 9C:
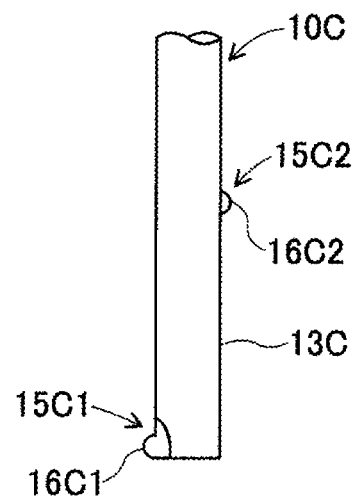
FIG. 9C is a front view showing an end mill directed to Fourth Embodiment.

As illustrated in FIG. 9C, an end mill 10C according to Fourth Embodiment comprises two toothed elements (15C1, 15C2) disposed at two locations which are separated away from one another in the axial direction of a body 13C. The respective toothed elements (15C1, 15C2) are toothed elements each including one of cutting edges (16C1, 16C2) which are disposed respectively at one location in the circumferential direction but at opposing positions interposing the axial center of the body 13C between them. In accordance with the end mill 10C, turning the body 13C once makes it feasible to form the dimples with gapped or discrepant pitches in a quantity of one, respectively, at two locations which are separated away from one another in the rotational direction and axial direction.

Figure 9D:
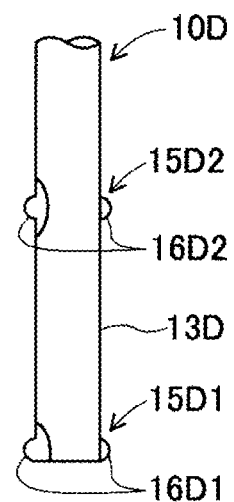
FIG. 9D is a front view showing an end mill directed to Fifth Embodiment.

As illustrated in FIG. 9D, an end mill 10D according to Fifth Embodiment comprises two toothed elements (15D1, 15D2) disposed at two locations which are separated away from one another in the axial direction of a body 13D. The respective toothed elements (15D1, 15D2) are toothed elements each including one of cutting edges (16D1, 16D2) in a quantity of two, which are disposed respectively at two locations in the circumferential direction and at opposing positions interposing the axial center of the body 13D between them. In accordance with the end mill 10C, turning the body 13D once makes it feasible to form the dimples in a quantity of four at two positions which are separated away from one another in the axial direction and rotational direction. Note that, when providing the bodies 13B through 13D with two toothed elements as disclosed in Third through Fifth Embodiments, it is also feasible to provide one of the two toothed elements with the cutting edge in a quantity of one, and to provide the other one of them with the cutting edge in a quantity of two, although the option is not illustrated in the drawings. If such is the case, the dimples are formed in a quantity of three by turning the body once. Moreover, when the cutting edge is disposed in a quantity of two or more, it is allowable to give the respective cutting edges different configurations. Thus, the dimples come to have a configuration corresponding to the configuration of each of the cutting edges.

Figure 10A:
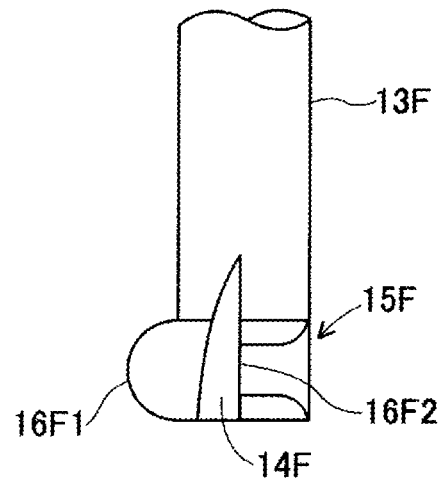
FIG. 10A is a front view showing Second Modified Embodiment of the cutting edge.
Figure 10B:
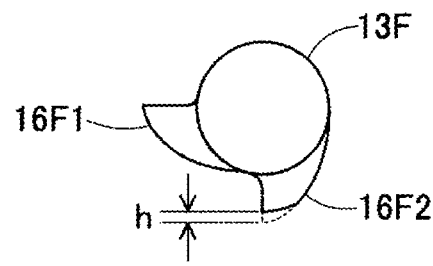
FIG. 10B is a plan view showing Second Modified Embodiment of the cutting edge.
Figure 10C:
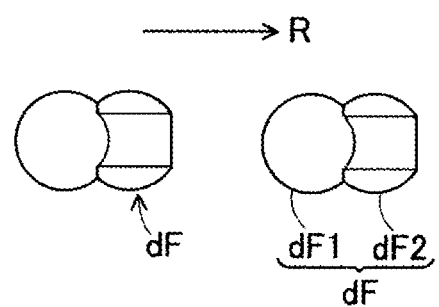
FIG. 10C is a plan view showing dimples according to Second Modified Embodiment.

Next, Second Modified Embodiment of the cutting edge will be illustrated by FIG. 10A through FIG. 10C. In Second Modified Embodiment, one toothed element 15F, which is disposed on the leading-end side of a body 13F, comprises an installation groove 14F, and two arc-shaped cutting edges (16F1, 16F2), which are disposed at two locations separated from one another in the circumferential direction by 90 deg. while interposing the installation groove 14F between them. As illustrated in FIGS. 10A and 10B, the cutting edge 16F1, which is disposed on a forward side in the rotary direction, is an arc-shaped tip, whereas the cutting edge 16F2, which is disposed on a rearward side in the rotary direction, is another arc-shaped tip whose leading end is cut off by a height "h" so that it is flattened out on a middle side in the axial direction. As a result, dimples "dF" formed by the cutting edges (16F1, 16F2) make a configuration in which a semicircle-shaped deep concave or depression "dF1" and a shallow concave or depression "dF2" flattened out at the axial middle arise in succession in the rotary direction "R," as shown in FIG. 10C. Accordingly, an advantageous effect of the dimples "dF," namely, retaining a lubricant or the like therein, is enhanced by thus making the dimples "dF" into the deep/shallow dual-consecutive structure. As a result, it becomes feasible to enhance the pressure between contact faces by the lubricant's squeezing effect. Consequently, the advantageous effect of lowering the processed faces in the friction is enhanced much more.

Figure 11:
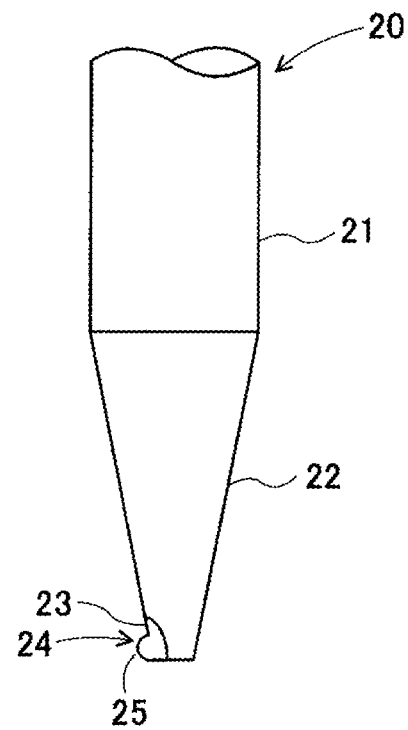
FIG. 11 is a front view schematically showing an end mill directed to Sixth Embodiment.

Subsequently to the above, an end mill 20 directed to Sixth Embodiment will be illustrated by FIG. 11.

The end mill 20 comprises: a major-diameter shank 21 doubling as the body; and a conical portion 22 disposed at an end of the shank 21, inclining at a predetermined angle to an axial line of the shank 21 to taper from large to small toward the leading end, constituting the body together with the shank 21, and having the configuration of a circular truncated cone; and further comprises one installation recess 23 recessed slightly at the leading end of the conical portion 22. The conical portion 22 is made into such a very minor diameter as 3.0-mm diameter, for instance, at the leading end. To the installation recess 23, a semispherical tip, which serves as one toothed element 24 and is made of cemented carbide, is installed; and is put in place so that a cutting edge 25, which is disposed at the leading end of the tip, swells in the shape of an arc, which has 1.5 mm in the radius, to protrude from an outer peripheral face of the conical portion 22. In Sixth Embodiment, too, the toothed element 24 is a toothed element that comprises the cutting edge 25 in a quantity of one, and which enables the dimples to be formed in a quantity of one by turning the conical portion 22 once. Note that, as to a configuration of the cutting edge 25, it can have the configurations as shown in FIG. 3A through FIG. 3H, or the configurations disclosed in First and Second Modified Embodiments.

Figure 12:
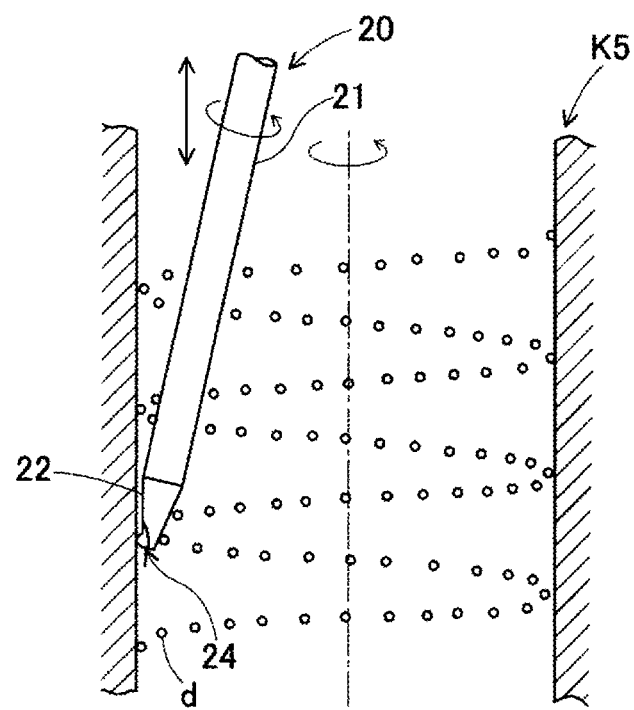
FIG. 12 is an explanatory diagram illustrating Fourth Processed Example made by the same end mill.

Fourth Processed Example of the dimples by the end mill 20 will be illustrated by FIG. 12. Fourth Processed Example is a process in which a dimples processing operation is performed onto a workpiece "K5," which has a cylindrical bore and is made of aluminum, on the inner peripheral surface. The end mill 20 is fixed on the side of the shank 21 to a not-shown rotary driving apparatus, so that it is put in place under such a condition that the outer peripheral surface of the conical portion 22 is put or held along the inner peripheral surface of the workpiece "K5." The end mill 20 is made not only turnable at a predetermined revolving speed but also movable at a predetermined rate in the axial direction of the workpiece "K5." The workpiece "K5" is made rotatable at a predetermined revolving speed by another not-shown rotary driving apparatus. The dimples processing operation is performed by moving the end mill 20 in the axial direction as being turned or vice versa, while rotating the workpiece "K5," so that the dimples "d," which are separated away from each other, are laid out in the shape of a helix on the inner peripheral face of the workpiece "K5." Note that as to a configuration of the dimples "d," it can be any of the configurations as described above.

Figure 13A:
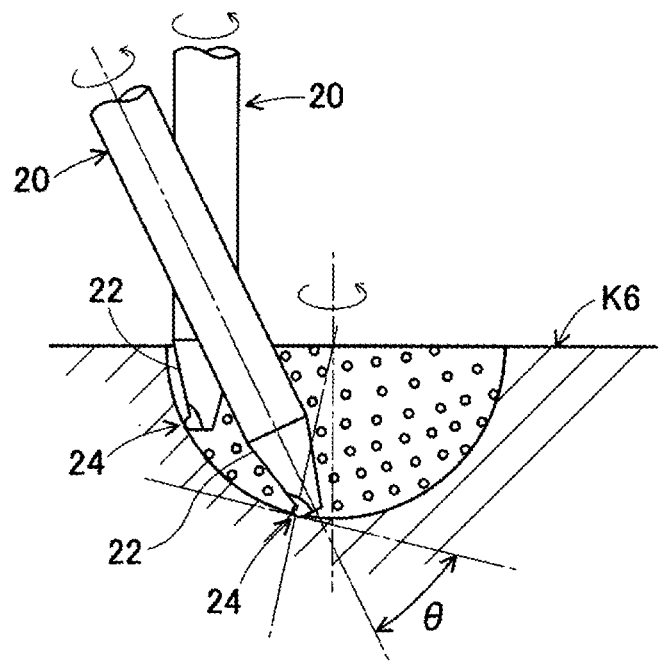
FIG. 13A is an explanatory diagram illustrating Fifth Processed Example made by the same end mill.
Figure 13B:
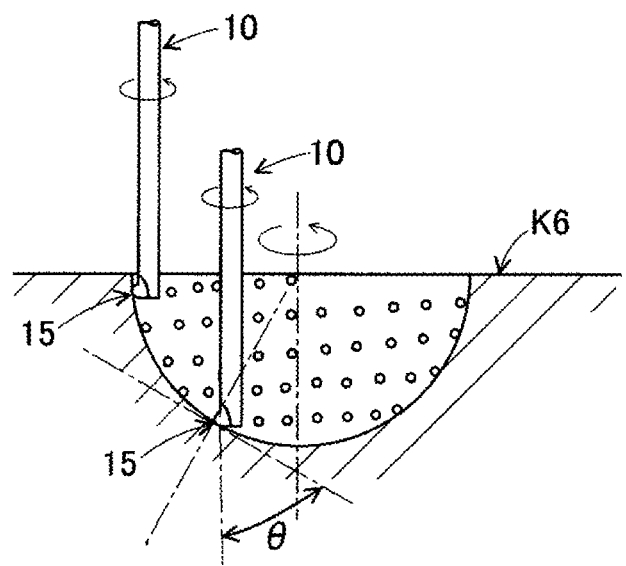
FIG. 13B is an explanatory diagram illustrating a processed example which is made by a round rod- or bar-shaped end mill to Fifth Processed Example.

Next, Fifth Processed Example resulting from the end mill 20 will be illustrated by FIG. 13A and FIG. 13B. Fifth Processed Example is a process in which a dimples processing operation is performed onto a workpiece "K6," which has a semispherical hole, on the inner peripheral face of the hole. As illustrated in FIG. 13A, the end mill 20 is put in place snugly against the hole at the opening. Then, the end mill 20 is moved at a predetermined rate in the axial direction as being turned, or vice versa, while rotating the workpiece "K6" around the central axis. Thus, it is possible to apply the cutting edge 25 so as to match the change of curvature in the semispherical face by inclining the axis of the end mill 20 along the curvature starting with a location at which the curvature in the inner wall face becomes larger. In this way, the dimples processing operation is performed highly densely onto the entire wall face of the semicircular hole.

In Fifth Processed Example, since the inner wall face of the workpiece "K6" makes a concaved or dented semicircular face as shown in FIG. 13A. Accordingly, at a contact position between the conical portion 22 of the end mill 20 and the workpiece "K6," in contrast to Fourth Processed Example, the axial center of the end mill 20 inclines at an inclination angle θ relative to a tangential face (or tangential plane) in the workpiece "K6." That is, in Fifth Processed Example, since the inclination of the end mill 20 is changed along the inner wall face, the inclination angle θ comes to fall in a range of from 0 deg. to 40 deg. approximately. Consequently, it becomes feasible to form the dimples properly. Moreover, in Fifth Processed Example, since strength is secured for the end mill 20 by the major-diameter shank 21, such a fear is less likely to arise as the end mill 20 might possibly suffer damages even when large forces are applied to the body part because of letting the end mill 20 carryout processing under the inclined condition.

On the contrary, when using the fine round-rod-shaped end mill 10 like the one in First Embodiment, the inclination angle θ becomes larger to go beyond the range of from 0 deg. to 75 deg. approximately, because the end mill 10 is kept to be perpendicular to the depth of the hole in the workpiece "K6," as shown in FIG. 13B. Accordingly, as the hole becomes deeper, it is not possible for the cutting edge to follow up the curvature that the semispherical face exhibits. Consequently, the dimples come to be made not uniformly in the configuration, and moreover it becomes impossible to do the processing at the bottom part. In addition, when inclining the end mill 10 in conformity with the change in the curvature of the hole, it becomes highly likely that such a fear as the end mill 10 might possibly be damaged owing to large forces applied to the minor-diameter body.

Figure 14:
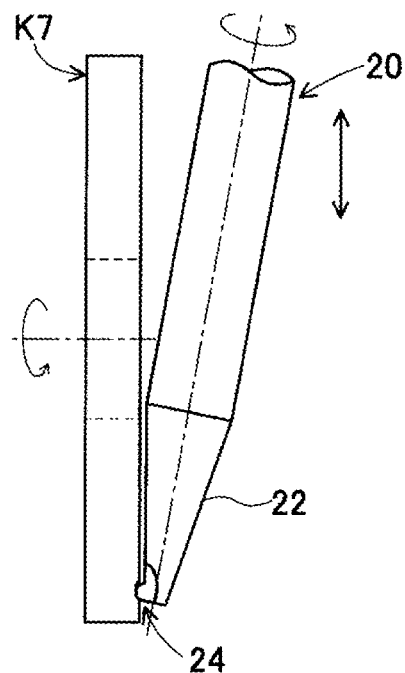
FIG. 14 is an explanatory diagram illustrating Sixth Processed Example made by the same end mill.
Figure 15:
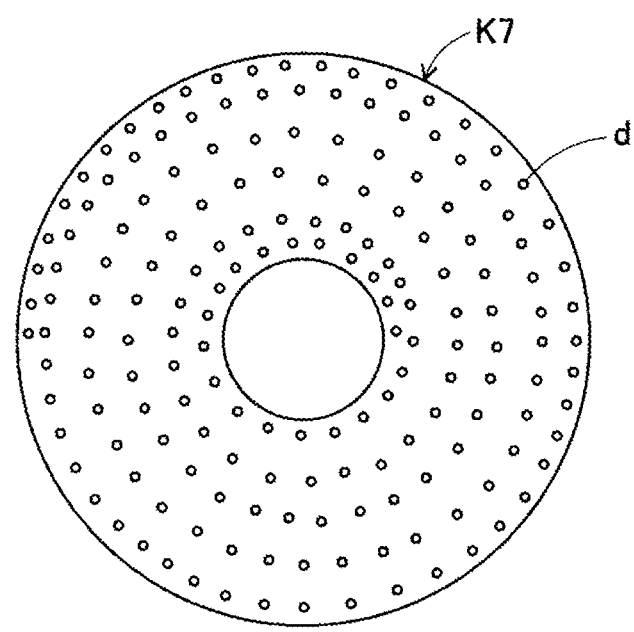
FIG. 15 is a plan view showing a workpiece "K7" whose processed face is made by Sixth Processed Example.

Next, Sixth Processed Example resulting from the end mill 20 will be illustrated by FIG. 14. Sixth Processed Example is a process in which a dimples processing operation is performed onto a workpiece "K7," which has a central bore and which is formed as a thick disk shape, on one of the faces. The end mill 20, which has been set in the same manner as Fourth Processed Example, is put in place snugly against one of the opposite faces of the workpiece "K7," and then the end mill 20 is kept to be turning and is further moved at a predetermined rate along the radial direction in the one of the opposite faces of the workpiece "K7," while rotating the workpiece "K7" around the central axis. Thus, the dimples processing operation is performed so that the small circle-shaped dimples "d" are arranged spirally and with high density on one of the opposite faces of the workpiece "K7," as shown in FIG. 15.

Figure 16:
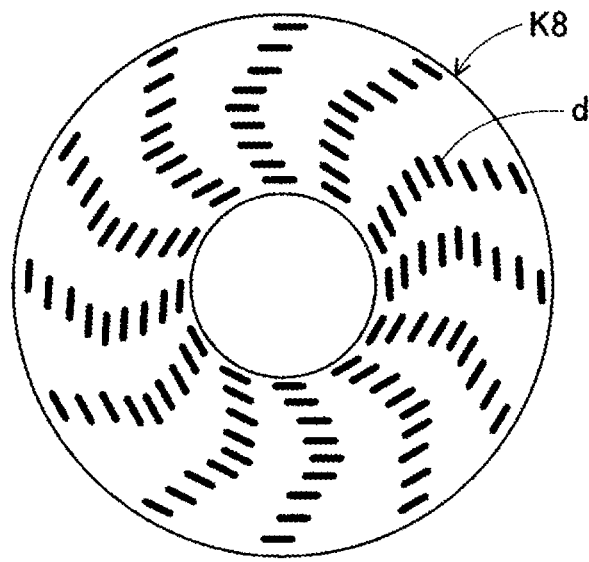
FIG. 16 is a plan view showing a workpiece "K8" whose processed face is made by Seventh Processed Example.

Seventh Processed Example, namely, another dimples processing operation by the end mill 20 onto one of the opposite faces of a workpiece "K8," which has a central bore and which is formed as a thick disk shape, will be illustrated by FIG. 16. As a processing form, it is the same as that illustrated in FIG. 14. However, the cutting edge has a lengthened configuration, and moreover the turning pitch is displaced while controlling it. Thus, it is possible to form the dimples "d" whose dimple length is longer, and which are laid out at equal intervals in the circumferential direction and curvedly in an arc shape relative to the radial direction, as shown in FIG. 16.

As described above, in Sixth Embodiment as well, it is possible to form the dimples in a quantity of one by turning or rotating the end mill 20 once, in the same manner as First Embodiment. Accordingly, it becomes feasible to form a large number of the dimples in desired arrangements and with high density on irregular curved faces having arbitrary configurations, not limited to the plain faces in the workpieces ("K5," "K6," "K7," "K8"), and the like, by turning the conical portion 22 at high rates while controlling it. In particular, in Sixth Embodiment, since it is possible to dispose the toothed element 24 on the leading-end side of the conical portion 22, it is possible to give the end mill 20 a very small diameter at a position at which the toothed element 24 is disposed, while securing strength for the end mill 20. As a result, in accordance with Sixth Embodiment, it is possible to form the dimples with much higher density. Moreover, it is possible to form the dimples in desired arrangements even onto wall faces with irregular facial configurations, and onto the inner wall face of deep bores or holes. In addition, since the conical portion 22 of the end mill 20 has a configuration that is sharpened toward the leading end, it is especially effective for forming the dimples onto concaved or dented curved faces.

As a consequence, in Sixth Embodiment as well, the following advantageous effects are obtainable: regarding the faces with the dimples formed, the sliding friction resistance or fluid resistance can be reduced; the wear resistance or heat radiating property can be improved; and so on. Consequently, the faces with the dimples formed can be employed suitably for many applications, such as the cylinders of an engine, the inner and outer wall faces of a piston or turbocharger and the joining faces between artificial joints, in compliance with their characteristics. Note that, in Sixth Embodiment as well, it is desirable to perform a surface treatment, such as chromium plating, onto the processed faces of the workpiece "K1" on which the dimples are formed, in the same manner as First through Fifth Embodiments. Moreover, in Six Embodiment as well, it is feasible to arrange the dimples, not limited to being arranged spirally or helically, but in circular shapes, straight-line shapes or curved-line shapes, and the like. In addition, regarding the end mill 20 according to Sixth Embodiment, it is also feasible to provide each one of the toothed elements 24 with the cutting edge in a quantity of two, in the same manner as the toothed element 15A according to Second Embodiment.

Figure 17:
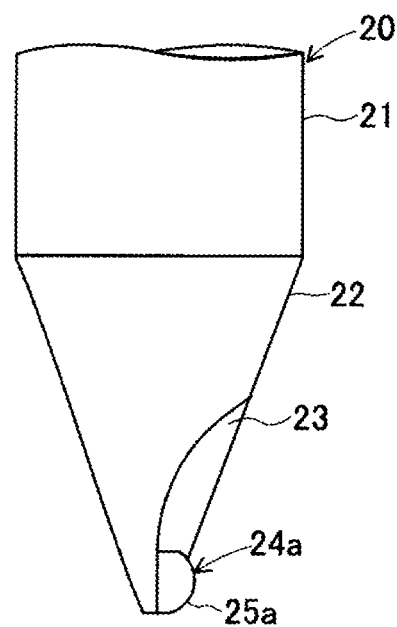
FIG. 17 is an enlarged plan view in which an end mill directed to a modified embodiment according to Sixth Embodiment is shown in an enlarged manner on the leading-end side.
Figure 18:
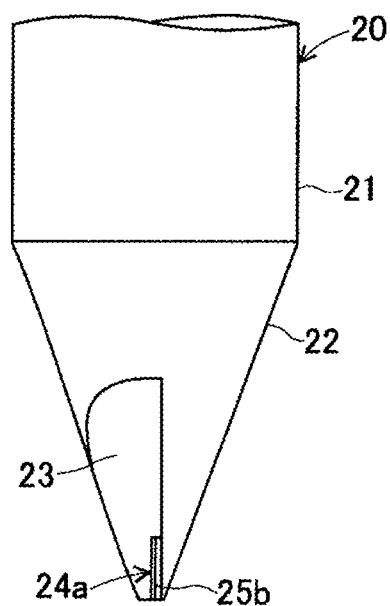
FIG. 18 is an enlarged right side view in which the same end mill is shown in an enlarged manner on the leading-end side.
Figure 19:
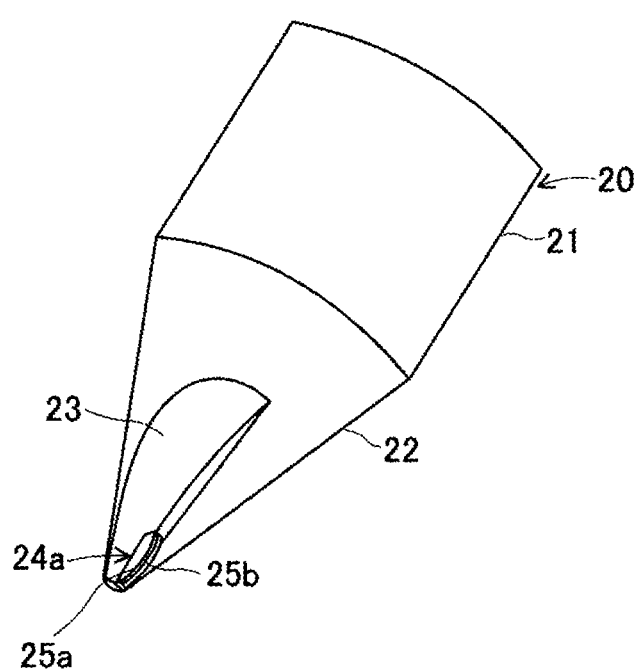
FIG. 19 is an enlarged perspective view in which the same end mill is shown in an enlarged manner on the leading-end side.

Next, a modified embodiment on the cutting tooth or tip in the end mill 20 directed to Sixth Embodiment will be illustrated by FIG. 17 through FIG. 19. A thin tipped plate 24a, which makes the toothed element and is made of a hard material, such as single-crystal diamond, polycrystalline diamond, CBN, cemented carbide or thermite, is welded to an installation recess 23 at the leading end of a conical portion 22. The tipped plate 24a has a unilateral-end cutting edge 25a that swells in the shape of an arc with 1.5-mm radius, and which is laid out to protrude from an outer peripheral face of the conical portion 22. The tipped plate 24a further has a flank 25b, which is formed in two stages, on the unilateral-end side. Thus, as disclosed in the present modified embodiment, forming the tipped plate 24a of a thin plate and forming the flank 25b in two stages result in making the cutting edge 25a carry out the formation of dimples more clearly or distinctly.

Figure 20:
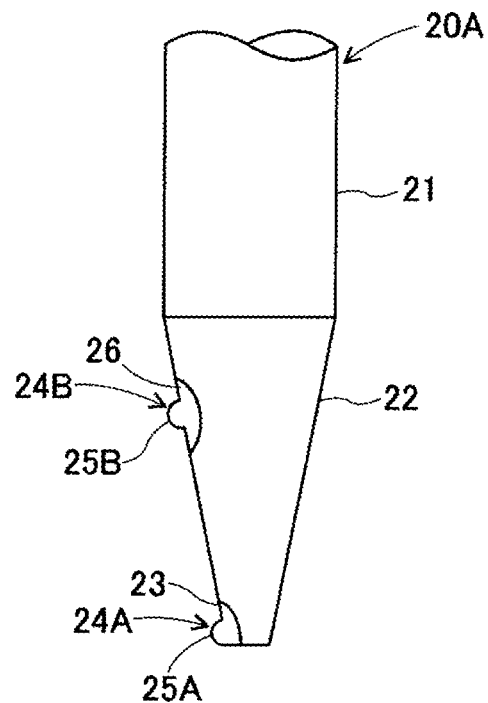
FIG. 20 is a front view schematically showing an end mill directed to Seventh Embodiment.

Subsequently to the above, an end mill 20A directed to Seventh Embodiment will be illustrated by FIG. 20.

Although the end mill 20A comprises a shank 21 and conical portion 22, which are the same as those of the end mill 20, it further comprises a toothed element 24A disposed on the leading-end side in a direction along the axial direction of the conical portion 22, a toothed element 24B disposed on the root side in the direction, and installation recesses (23, 26), which are concaved or dented slightly atone location in the toothed element 24A and additionally at one location in the toothed element 23B, respectively. Moreover, a chip, which makes the toothed elements (24A, 24B) and is made of cemented carbide, is installed to the installation recesses (23, 26) respectively, and has at the leading end a cutting edge (25A or 25B), which is laid out to swell in the shape of an arc to protrude from an outer peripheral face of the conical portion 22. That is, in the same manner as the end mill 10B according to Third Embodiment, the end mill 20A comprises the two toothed elements (24A, 24B) at two locations, which are separated away from one another in the axial direction of the conical portion 22; and the respective toothed elements (24A, 25B) are the toothed elements, which respectively include the cutting edges (25A, 25B) in a quantity of one at one location in the circumferential direction and at an identical axial position. In Seventh Embodiment, turning the end mill 20A once leads to making it possible to form the dimples in a quantity of one, respectively, at two locations which are separated away from one another in the axial direction.

Figure 21:
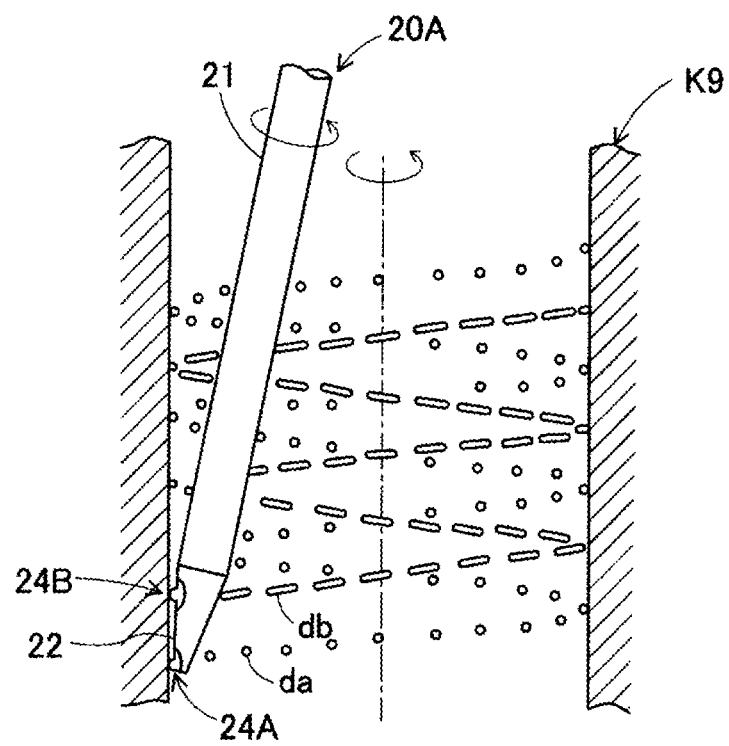
FIG. 21 is an explanatory diagram illustrating Eighth Processed Example made by the same end mill.

Eighth Processed Example of the dimples resulting from the end mill 20A will be illustrated by FIG. 21. Eighth Processed Example is a process in which a dimples processing operation is performed onto a workpiece "K9" which has a cylindrical bore and is made of aluminum, on the inner peripheral face. The end mill 20A is fixed on the side of the shank 21 to a not-shown rotary driving apparatus, so that it is put in place under such a condition that the outer peripheral face of the conical portion 22 is brought into contact with the inner peripheral face of the workpiece "K9." The end mill 20A is made turnable around an axial center at a predetermined revolving speed, and the axial center is also made movable at a predetermined rate in the axial direction of the workpiece "K9." The workpiece "K9" is made rotatable at a predetermined revolving speed by another not-shown rotary driving apparatus. The dimples processing operation is performed by moving the end mill 20A in the axial direction as being turned, or vice versa, while rotating the workpiece "K9," so that the circular dimples "da," which result from the leading-end-side cutting edge 25A, and the rod-shaped dimples "db," which result from the root-side cutting edge 25B, are given on the inner peripheral face of the workpiece "K9" in two rows, which are separated away from one another in the axial direction in the shape of a helix.

Note that, regarding the end mill 20A according to Seventh Embodiment, it is also feasible to dispose the cutting edge 25B of the toothed element 24B on an opposite side relative to the axial center, in the same manner as the toothed element 15c2 according to Fourth Embodiment. Moreover, regarding the end mill 20A, it is feasible to provide each of the toothed elements (24A, 24B) with two cutting edges, which respectively oppose one another relative to the axial center, in the same manner as the toothed element (15D1, 15D2) according to Fifth Embodiment.

In addition, in each of the aforementioned embodiments, the workpiece is also rotated in addition to turning the end mill as well as moving it in the axial direction, or the like. However, instead of the operations, mounting or attaching the end mill onto a driving control apparatus, such as a multi-jointed robot, and then subjecting the end mill to the driving control lead to making it feasible to move the axial center of the body freely incompliance with a superficial configuration of the workpiece while turning or rotating the end mill about the axial center serving as the center. Thus, it becomes feasible to process the dimples onto workpieces, which have various irregular curved faces, by driving the body alone, while keeping the workpiece being fixated. Consequently, it is possible to process the dimples more easily or readily and highly accurately. Moreover, a large-sized apparatus for rotating large workpieces becomes needless.

Note that, in the descriptions on the aforementioned respective embodiments, the present invention is disclosed as the end mills to which the tips are installed. However, the end mills can be any end mills made of cemented carbide, per se; moreover, they can be any coated end mills. Alternatively, the end mills can be any mills to which a PCD or CBN tip is brazed.

Figure 22:
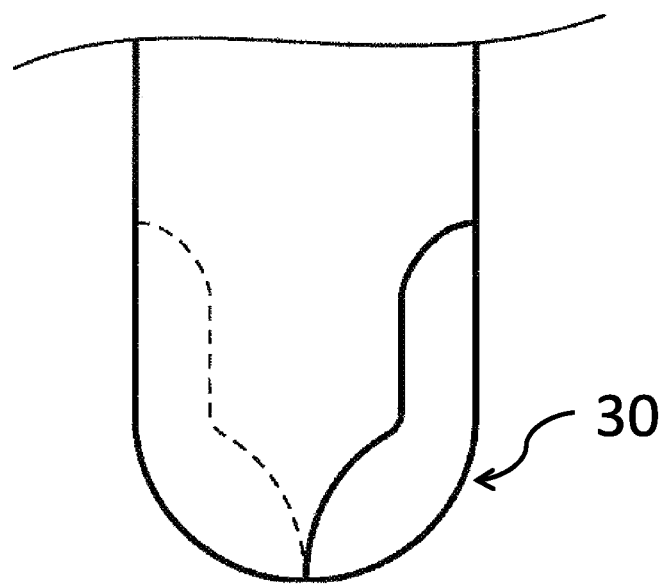
FIG. 22 is a schematic representation of a non-limiting illustrative ball-end mill.

Next, Eighth Embodiment will be described. In each of the aforementioned embodiments, the disclosed end mills are the ones to which the tips are installed to an outer peripheral face of the body. However, in the present embodiment, a ball-end mill 30, which comprises a spherical cutting edge disposed on an end face of the rod-shaped body, is adapted for any one of the end mills, and a non-limiting illustrative example of the ball-end mill 30 is shown schematically in FIG. 22 of the drawings. Thus, even using such a ball-end mill makes it is also possible to form the dimples, which are separated away from each other, on the surface of a workpiece, in the same manner as disclosed in the aforementioned embodiments.

In addition to the above, note that, as to the following, they are some of the examples: the form of the end mill disclosed in each of the aforementioned embodiments; the configuration and lay-out of the cutting edge; the form and material quality of the workpiece; and so on. Therefore, it is possible to execute or implement the present invention while changing or modifying them within a range not departing from the spirit or scope of the present invention.

The invention claimed is:

1. A dimples processing method by milling, the dimples processing method being adapted for processing dimples, which are minor-diameter concaves or dents separated away from each other, by rotary cutting a surface of a workpiece using a milling cutter provided with one single toothed element which comprises one or two cutting edges disposed on an outer peripheral face near an end portion of a rod-shaped body having a rotational axis, the dimples processing method comprising:

keeping a predetermined interval between the surface of the workpiece and the one single toothed element and moving the workpiece and the milling cutter relatively at a predetermined speed;

providing the rod-shaped body of the milling cutter with a conical portion reducing diametrically as heading toward a leading end of the rod-shaped body, the one or two cutting edges being disposed on an outer peripheral surface of the conical portion; and forming the dimples separated away from neighboring dimples in a quantity of the number of cutting edges by rotating the rod-shaped body only once around the rotational axis.

2. The dimples processing method by milling as set forth in claim 1, wherein an inclination angle of an axial center in the body with respect to a tangential face in the workpiece is set to fall in a range of from −20 deg. to +75 deg. at a contact position between the body and the workpiece.

3. The dimples processing method by milling as set forth in claim 1, wherein the milling cutter rotates around the rotational axis in compliance with a superficial configuration of the workpiece.

4. The dimples processing method by milling as set forth in claim 1, wherein
the milling cutter includes the one single toothed element and a second single toothed element in which the one single toothed element is arranged near an end portion and the second single toothed element is positioned separated away from the one single toothed element in a direction of the rotational axis,
the milling cutter is positioned relative to the workpiece at a position capable of rotary cutting by both the one single toothed element and the second single toothed element and the predetermined interval is maintained; and
the dimples are formed in a quantity of two to four which are mutually separated away from one another by turning the rod-shaped body only once around the rotational axis.

5. The dimples processing method of milling as set forth in claim 1, wherein the milling cutter is a ball end mill.

* * * * *